Jan. 11, 1927.
H. W. ROBINSON
CORD TAKE-UP
Filed July 10, 1925
1,614,393
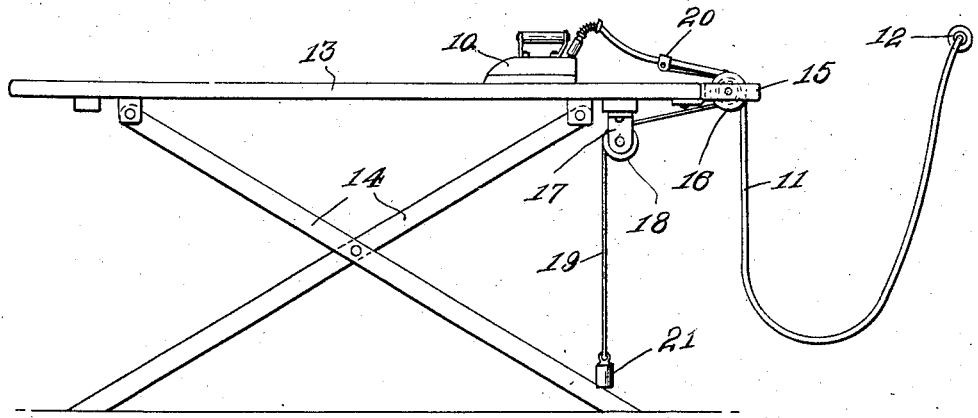
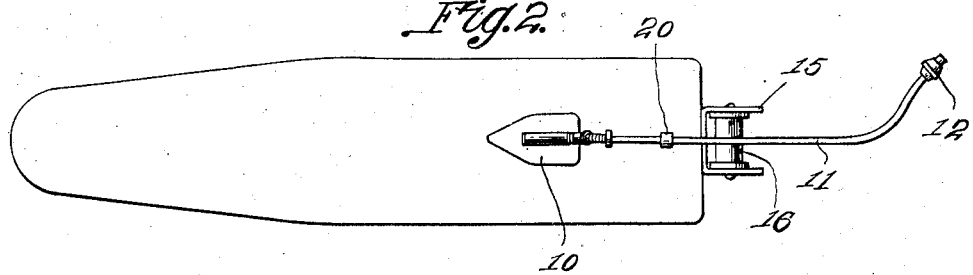
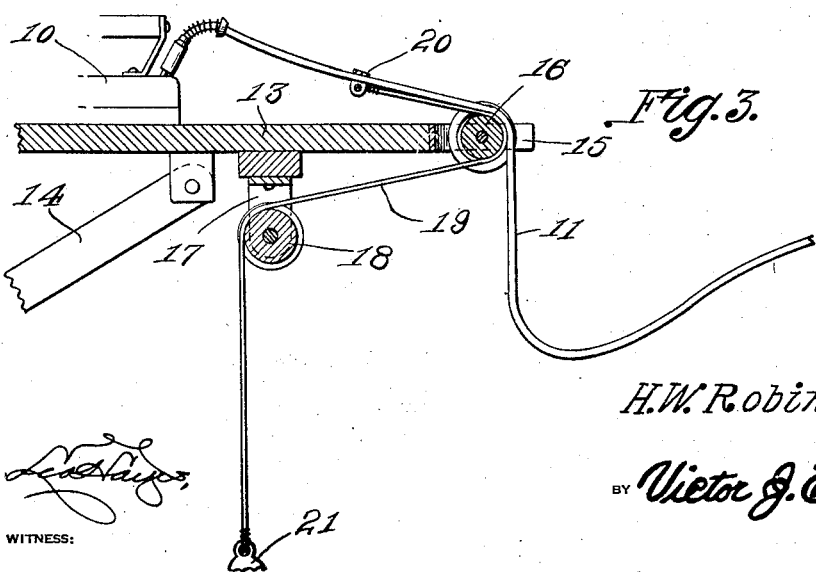
H. W. Robinson, INVENTOR
BY Victor J. Evans, ATTORNEY Patented Jan. 11, 1927.

1,614,393

UNITED STATES PATENT OFFICE.

HARVEY W. ROBINSON, OF LAKEMORE, OHIO.

CORD TAKE-UP.

Application filed July 10, 1925. Serial No. 42,854.

This invention relates to improvements in take up devices and has for an object the provision of a device of this character which is especially designed for use in connection with the conductor cord of an electric iron or the like and which will keep the cord out of the way of the user of the iron.

For this purpose the invention provides a weight operated cord adapted to be attached to the conductor cord of the iron and guided over the end of an ironing board to permit of the iron being freely moved over the board and at the same time take up slack in the cord adjacent the iron.

With the above and other objects in view, the invention further includes the following novel features and details of construction, to be hereinafter more fully described, illustrated in the accompanying drawings and pointed out in the appended claim.

In the drawings:—

Figure 1 is an elevation showing an ironing board and an iron with the invention applied.

Figure 2 is a top view of the same.

Figure 3 is an enlarged fragmentary section taken longitudinally through one end of the board.

Referring to the drawings in detail wherein like characters of reference denote corresponding parts, the reference character 10 indicates an electric iron to which is attached one end of a conductor cord 11, the opposite end of this cord being suitably connected with a source of electric current, a plug 12 being shown for this purpose.

The reference character 13 designates an ironing board which may be of any suitable type, the one shown being supported upon legs 14.

Secured to one end of the board is a bearing bracket 15 which includes spaced arms, the latter extending outward beyond the periphery of a grooved guide roller 16 which is mounted between the arms. Secured between the spaced arms of the bearing bracket 17 which extends downwardly from beneath the board 13 is a grooved guide roller 18 and passing over this roller and the roller 16 is a take up cord 19. One end of this cord is secured to the cord 11 by means of an insulated clamp 20, while the opposite end of the cord 19 has secured thereto a weight 21.

It will be apparent from the foregoing description and accompanying drawings that the invention provides means for automatically taking up slack in the cord 11 adjacent the iron 10 so that the cord will not be in the way of the user of the iron. At the same time, the iron may be freely moved over the board. By extending the arms of the bracket 15 beyond the roller 16, a guide is provided for the cord 11 so that the latter will move over the roller 16, while movement of the cord 19 will impart rotation to the roller 16 and act to fit the cord 11 over said roller.

The invention is susceptible of various changes in its form, proportions and minor details of construction and the right is herein reserved to make such changes as properly fall within the scope of the appended claim.

Having described the invention what is claimed is:—

An electric cord take up device comprising in combination, a horizontally disposed support, a guide roller supported at one end thereof, a lower guide roller beneath the support and spaced inward from said end, a conductor cord adapted to extend over the end roller, a take up cord having one end secured to the conductor cord and extending over the end roller and the lower roller downwardly beneath the horizontally disposed support and a weight carried by the take up cord.

In testimony whereof I affix my signature.

HARVEY W. ROBINSON.